Aug. 12, 1958    B. P. ARTERBURY ET AL    2,847,073
TOOL FOR CONTROLLING FLUID CIRCULATION IN WELL BORES
Filed Aug. 6, 1954    8 Sheets-Sheet 1
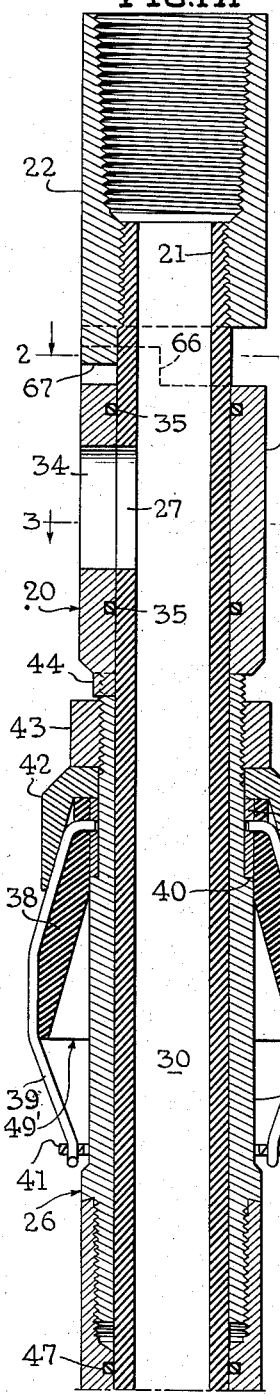
Fig.1-A
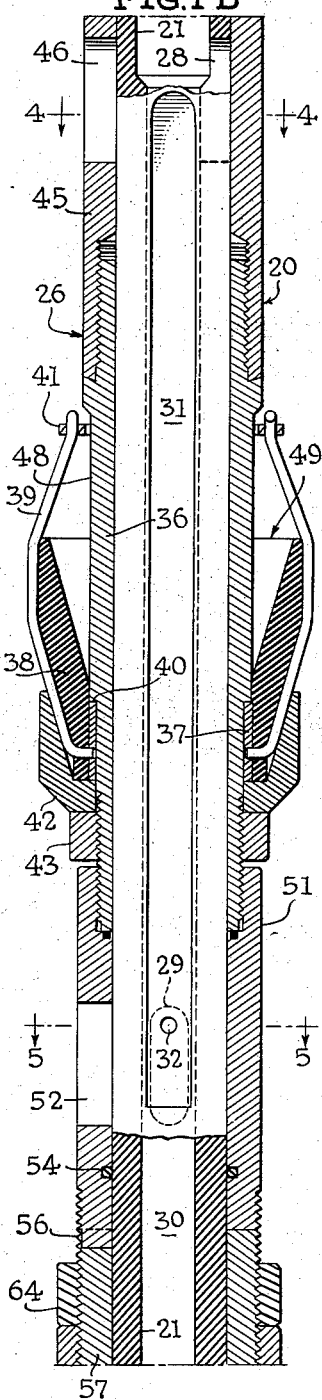
Fig.1-B
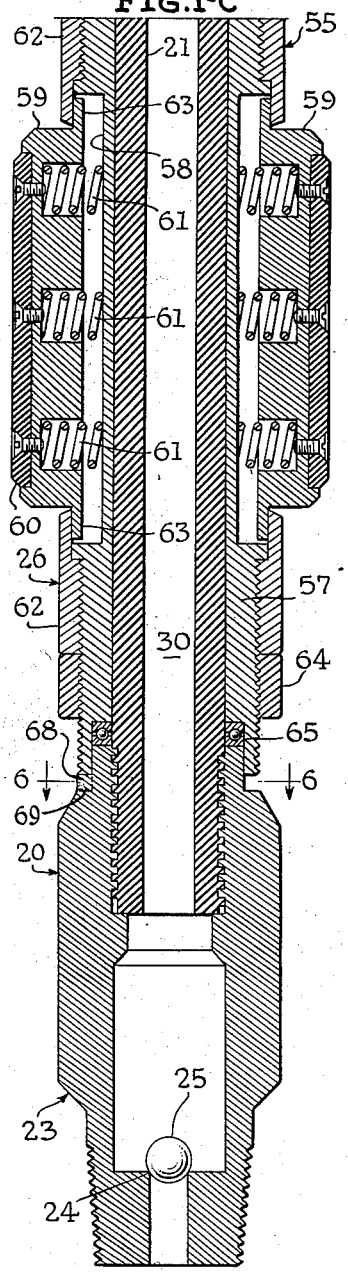
Fig.1-C
INVENTORS
Bryant P. Arterbury
and George M. Clark
BY   Wm. E. Ford
ATTORNEY Aug. 12, 1958

B. P. ARTERBURY ET AL 2,847,073

TOOL FOR CONTROLLING FLUID CIRCULATION IN WELL BORES

Filed Aug. 6, 1954

INVENTORS
Bryant P. Arterbury
and George M. Clark

BY Wm. E. Ford

ATTORNEY

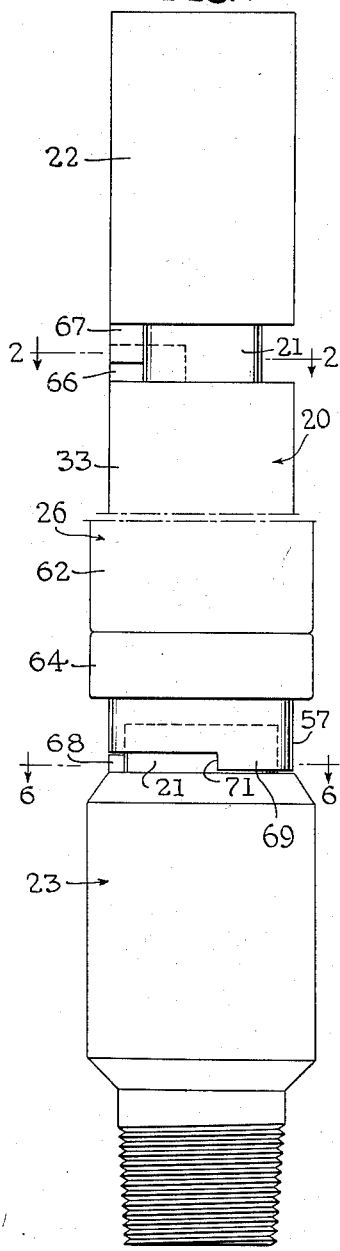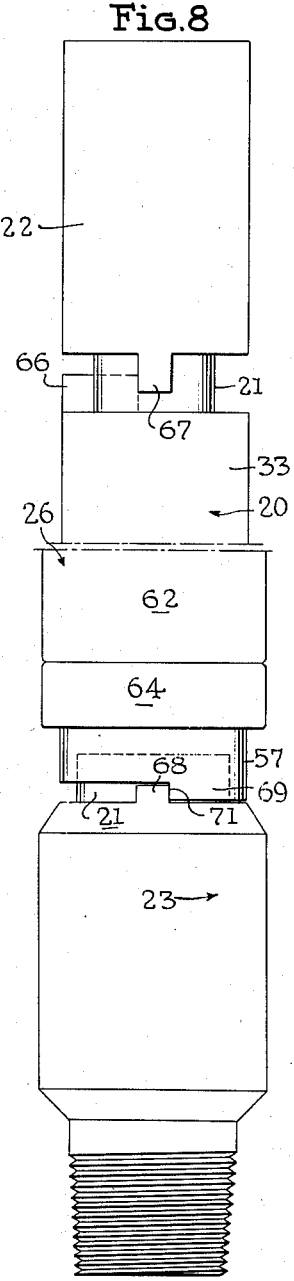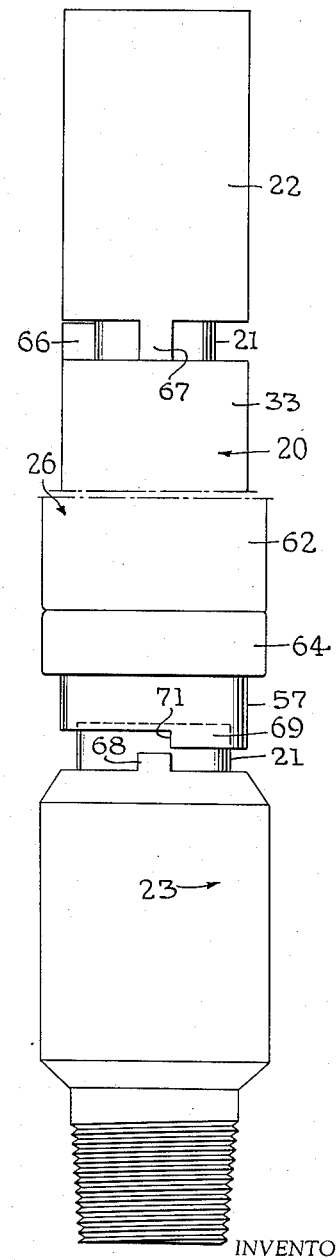

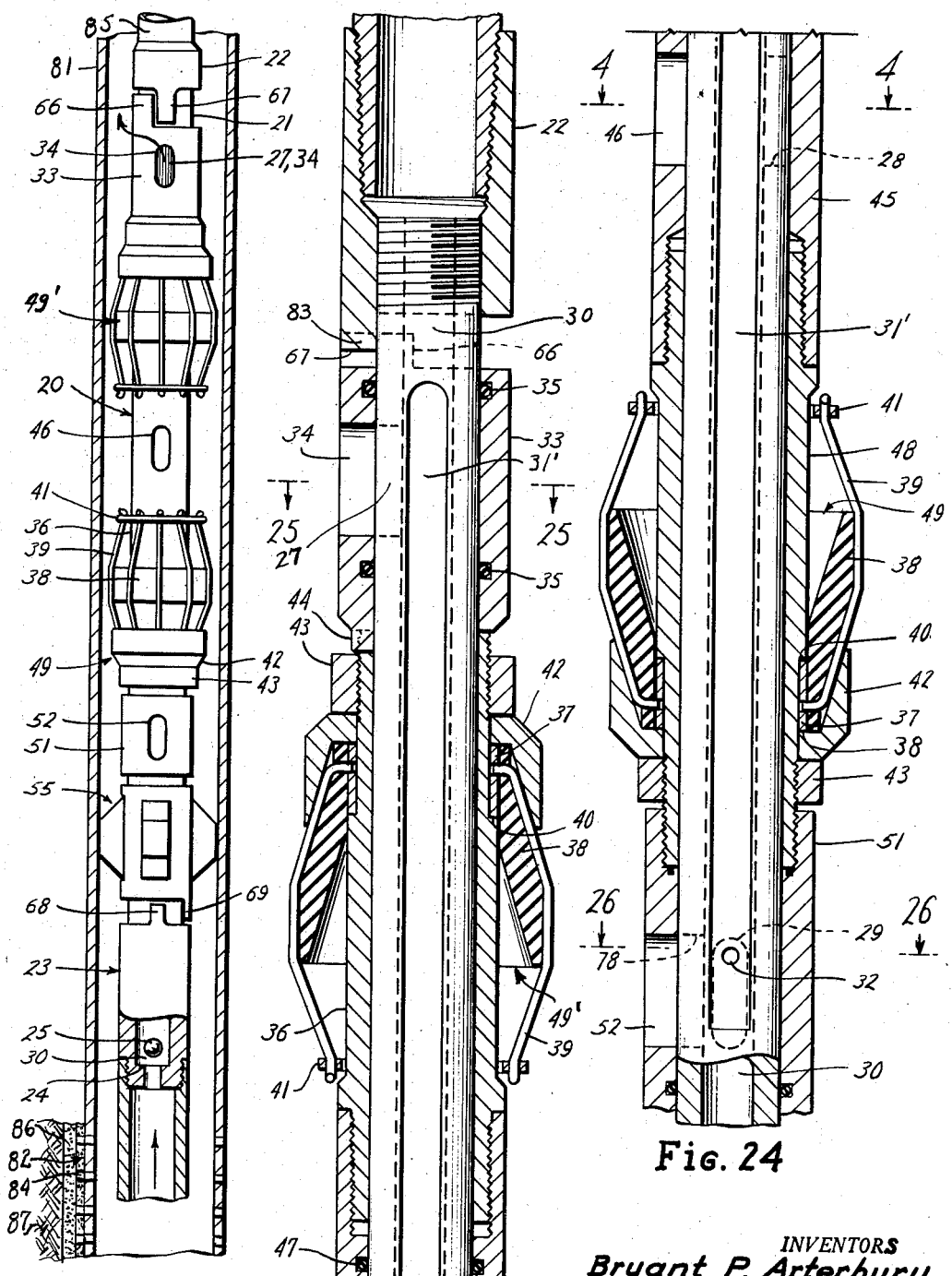

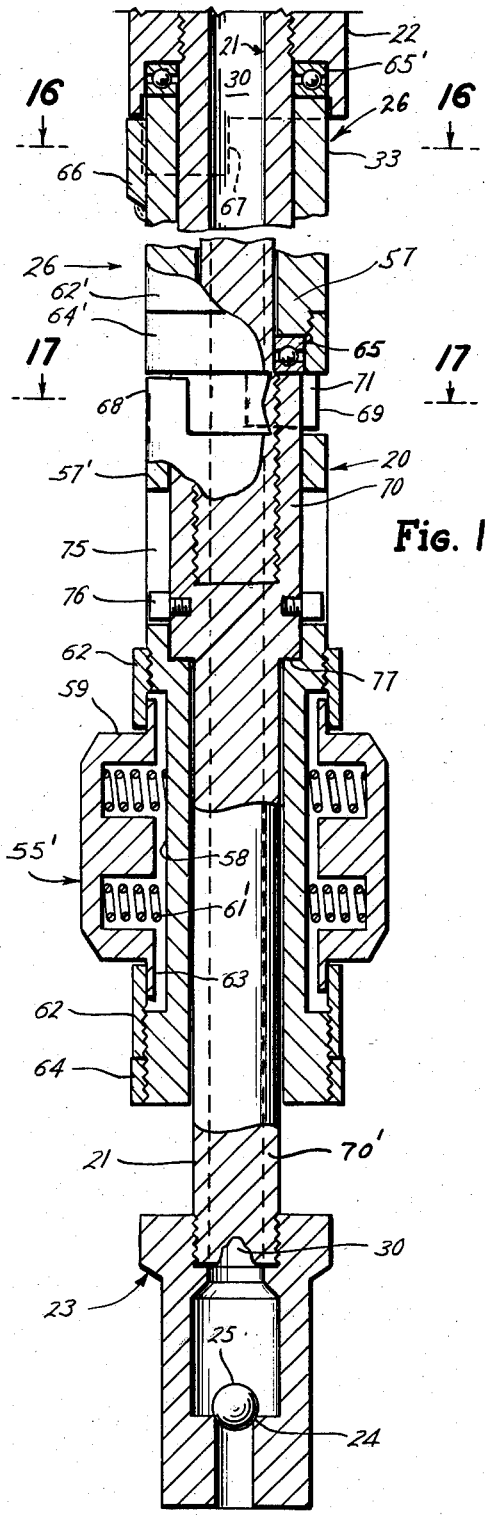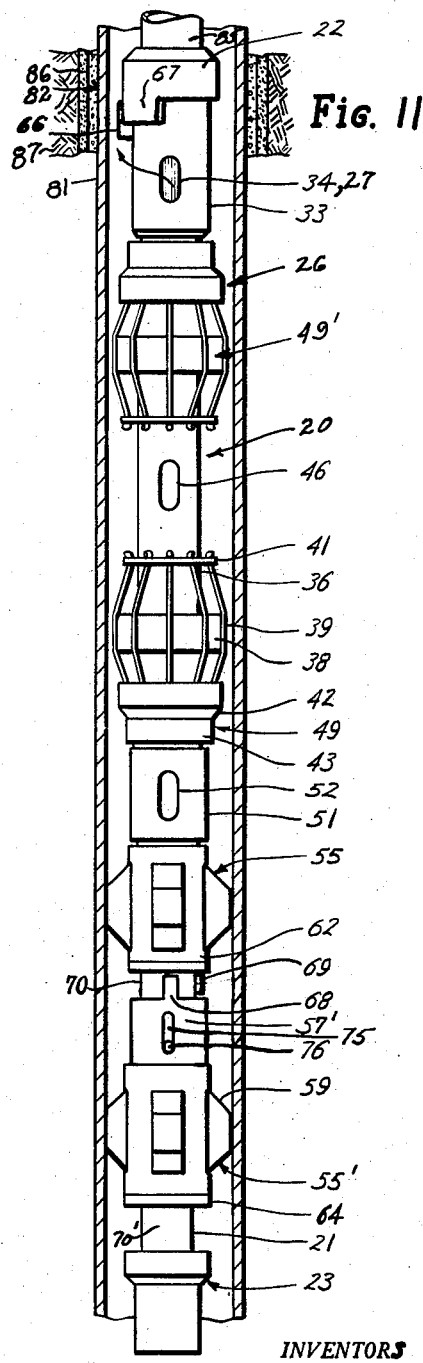

Aug. 12, 1958   B. P. ARTERBURY ET AL   2,847,073
TOOL FOR CONTROLLING FLUID CIRCULATION IN WELL BORES
Filed Aug. 6, 1954   8 Sheets-Sheet 6
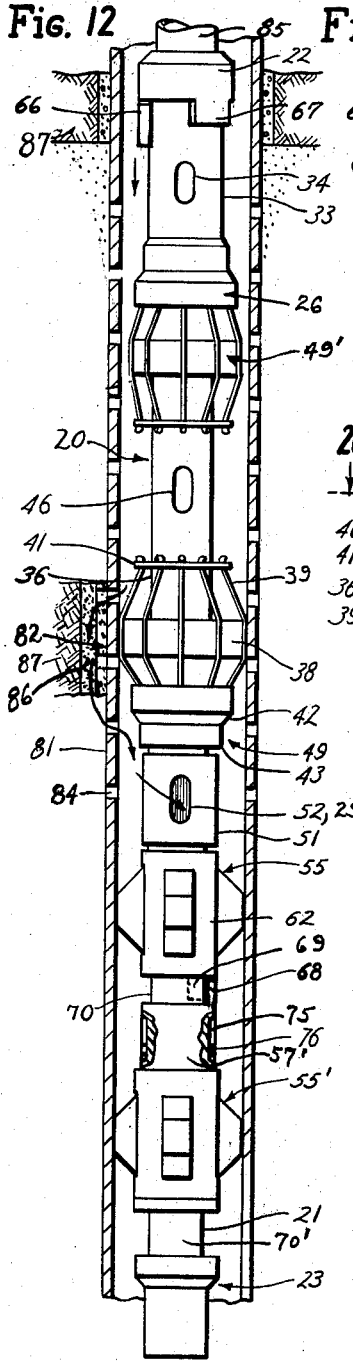
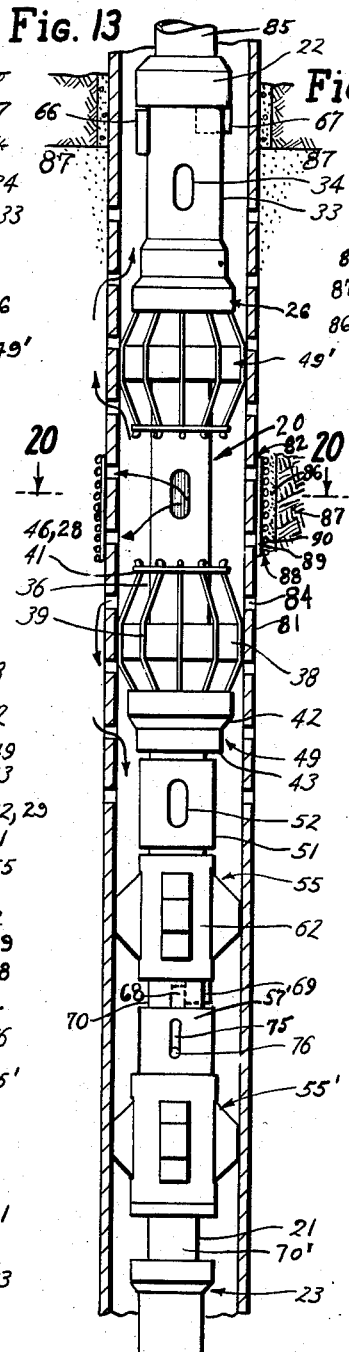
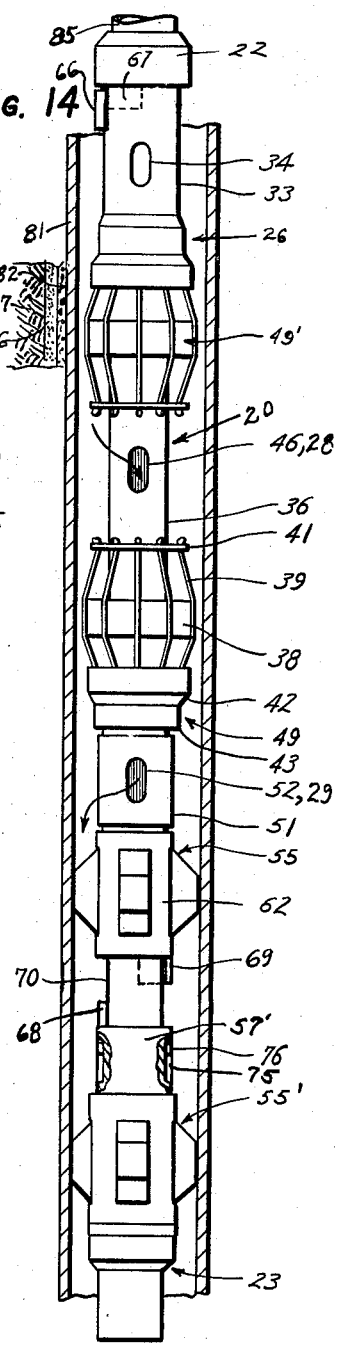
INVENTORS
Bryant P. Arterbury
and George M. Clark
BY Wm. E. Ford
ATTORNEY INVENTORS
Bryant P. Arterbury
and George M. Clark
BY
Wm. E. Ford
ATTORNEY

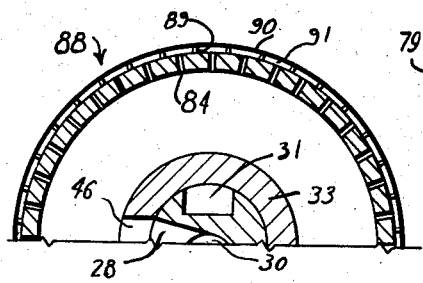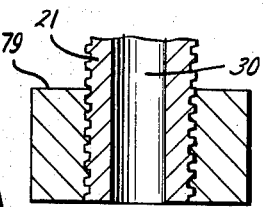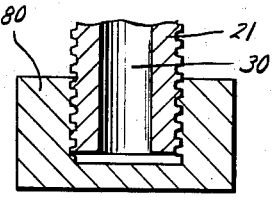
Fig. 20    Fig. 21    Fig. 22
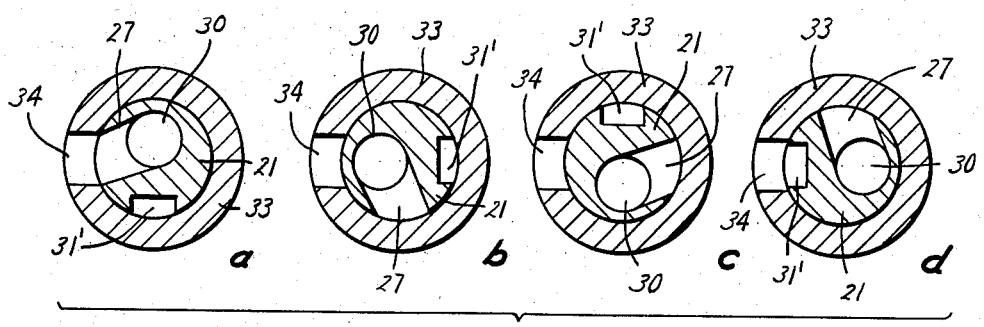
Fig. 25
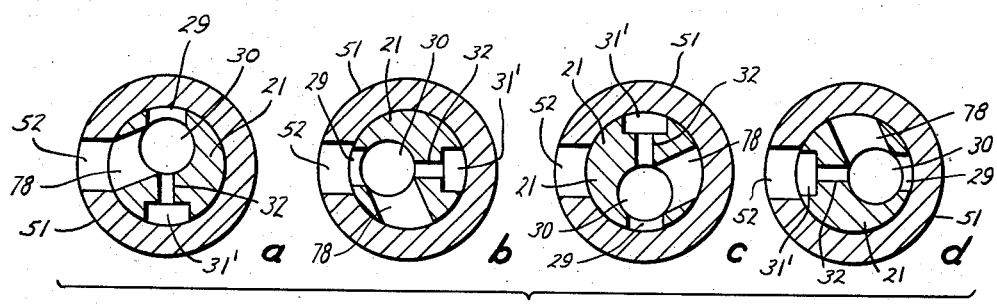
Fig. 26
INVENTORS
Bryant P. Arterbury
and George M. Clark
BY   *Wm. E. Ford*
ATTORNEY United States Patent Office 2,847,073
Patented Aug. 12, 1958

2,847,073

TOOL FOR CONTROLLING FLUID CIRCULATION IN WELL BORES

Bryant P. Arterbury and George M. Clark, Houston, Tex., assignors of thirty-three and one-third percent to Roy L. Arterbury, Houston, Tex.

Application August 6, 1954, Serial No. 448,285

27 Claims. (Cl. 166—147)

This invention relates to well service tools for controlling fluid circulation in well bores, and particularly it relates to an improved form of tubing-connected tool of the type described by the applicants and claimed in copending application Serial No. 553,579, filed December 16, 1955, such application being in turn a continuation-in-part application of application Serial No. 340,574 of the applicants for Oil Well Service Tool, filed March 5, 1953, and now abandoned.

It is a broad object of this invention to provide a tool which is adapted to be selectively positioned so that well bore fluid may be circulated through a plurality of channels therein and in a plurality of directions for carrying out a plurality of operations in a plurality of sequences without requiring removal of the tubing and tool connected thereto in order to change over from one operation to another.

It is another object of this invention to provide a tool of this class which has fluid channel means therethrough through which fluid may circulate upwardly and outwardly as the tool is lowered into the well bore thereby preventing displacement of the circulating fluid in the tubing above the tool.

It is another object of this invention to provide a tool of this class having vertically spaced apart packers thereon and which has a fluid channel means therethrough which may be utilized to circulate fluid to wash a material deposit, as sand, from above the upper packer.

It is also an object of this invention to provide a tool of this class which has fluid channel means therethrough through which fluid may be circulated either down the casing annulus around the tubing, out through a perforated portion of the casing, and up the tubing, or reversely, down the tubing, out through the perforated portion, and up the casing annulus, to clean the perforations and wash the area outwardly thereof.

It is also another object of this invention to provide a tool of this class which has fluid channel means therethrough through which fluid may be forced outwardly and through a perforated portion of the casing into the surrounding formation to increase its porosity so that production fluids, as oil, may flow therefrom.

It is a further object of this invention to provide a tool of this class which has fluid channel means therethrough through which a force, as a "swabbing" force, may be applied to break down the formation surrounding a perforated portion of the casing and draw production fluids therefrom into such channel means to follow upwardly after the force applying means, such force applying means also being employable to cleanse the perforate portion and its vicinity of materials, as sand, and of fluids, as acid.

It is also a further object of this invention to provide a tool of this class which has vertically, closed spaced apart, reversely set packers thereon and channel means therethrough through which relatively highly pressurized fluid may be circulated to pass outwardly therefrom into the space between packers and then through a relatively short length of perforate casing between packers forming part of a longer perforate length to thus positively and forcefully clean the perforations of such short length and to fracture obstructing materials therefrom, as by a produced jet effect, the forced fluid then washing and cleaning surrounding areas outwardly of the short perforate length.

It is yet another object of this invention to provide a tool of this class which has such a channel means therein to receive material as sand washed from between the packers, such material being washed thereinto by fluid circulated down the casing to be delivered up the tubing.

It is yet a further object of this invention to provide a tool of this class having such a channel means therein which tool is adapted to be lowered or raised as in step by step operations, to selectively service a relatively long length of perforate casing by working concentratedly in selected short lengths thereof.

It is still another object of this invention to provide a tool of this class having fluid channel means therein through which fluid pressures may be neutralized above and below the packers both in the casing and in the tubing, as in cases, for instance, when the tubing and tool are to be withdrawn from the well bore.

It is still a further object of this invention to provide a tool of this class having fluid channel means therein through which acid may be directed to the space between packers, or to the well bore space extraneous thereto, and outwardly from such spaces through casing perforations or the well bore wall to the surrounding formation in which the acid acts to dissolve, and react with material tending to retard the flow of production fluids into the well bore.

It is an additional object of this invention to provide a tool of this class adapted, upon manipulation, to be shifted to open channels therein through which acid may be removed from such producing formations and from the well bore.

It is also an additional object of this invention to provide a tool of this class adapted to be shifted from one channel means to other safe-guarding channel means, as in cases, for instance, when a breakdown of formation in a producing formation under high pressure tends to blow the circulating fluid out of the well bore.

It is a further additional object of this invention to provide a tool of this class in which various channel means therein are made effective by relative movement between a sleeve which supports the packers thereon and frictionally engages the well bore and a mandrel extending through the sleeve and connected to the drill stem.

It is another additional object of this invention to provide a tool of this class in which changes between channel means are effected in instances by the steps of mandrel lowering, rotation, and raising with respect to the sleeve.

It is yet a further additional object of this invention to provide a tool of this class in which changes between channel means are effected in instances by the steps of mandrel raising, rotation, and lowering with respect to the sleeve.

It is still another additional object of this invention to provide a tool of this class adapted to make available less than all of the channel means hereinabove described in various combinations.

It is yet another object of this invention to provide a tool of this class adapted to displace without loss one fluid, as a viscous circulating fluid, from the tubing by supplying another fluid, as an acid, thereinto, such tool then being shiftable to forcefully expel such acid between packers thereon through a perforated screen section and into the surrounding formation to apply such acid, as to clean the perforations, and to increase the productivity of the formation.

It is also a further object of this invention to provide a tool of this class adapted to circulate a washing fluid, as hot water, or a dissolving fluid, as acid, down the tubing and up the well bore to respectively dissolve paraffin or cut rust from the casing and tubing.

Other and further objects will be apparent when the description hereinbelow is considered in connection with the attached drawings in which like reference numerals refer to corresponding elements in the several disclosed embodiments in the various figures, of which:

Fig. 1-A is a sectional elevation of the upper part of an embodiment of the invention;

Fig. 1-B is a sectional elevation of the central part of the tool of which the upper part is shown in Fig. 1-A;

Fig. 1-C is a sectional elevation of the lower part of the tool of which the upper part is shown in Fig. 1-A;

Fig. 2, position a, is a sectional plan view taken along section 2—2 of Fig. 1-A, and along line 2—2 of Fig. 7, such figure also showing lug positions b, c, and d, corresponding respectively with 90°, 180°, and 270° relative rotation between mandrel and sleeve from position a;

Fig. 3, position a, is a sectional plan view taken along section 3—3 of Fig. 1-A, such figure also showing port positions b, c, and d, corresponding respectively with 90°, 180°, and 270° relative rotation between mandrel and sleeve from position a;

Fig. 4, position a, is a sectional plan view taken along line 4—4 of Fig. 1-B, such figure also showing port positions b, c, and d, corresponding respectively with 90°, 180°, and 270° relative rotation between mandrel and sleeve from position a;

Fig. 5, position a, is a sectional plan view taken along line 5—5 of Fig. 1-B, such figure also showing port positions b, c, and d, corresponding respectively with 90°, 180°, and 270° relative rotation between mandrel and sleeve from position a;

Fig. 6, position a, is a sectional plan view taken along line 6—6 of Fig. 1-C, and along line 6—6 of Fig. 7, such figure also showing lug positions b, c, and d, corresponding respectively with 90°, 180° and 270° relative rotation between mandrel and sleeve from position a;

Fig. 7 is a fragmentary elevational view of the tool shown in Figs. 1-A, 1-B, and 1-C illustrating relative sleeve lug and mandrel lug positions corresponding with the positions shown in plan in Fig. 2, position a, for the upper lugs, and in Fig. 6, position a, for the lower lugs.

Fig. 8 is a fragmentary elevational view of the tool shown in Figs. 1-A, 1-B, and 1-C, illustrating relative sleeve lug and mandrel lug positions corresponding with the positions shown in plan in Fig. 2b for the upper lugs, and in Fig. 6, position b, for the lower lugs.

Figure 2:
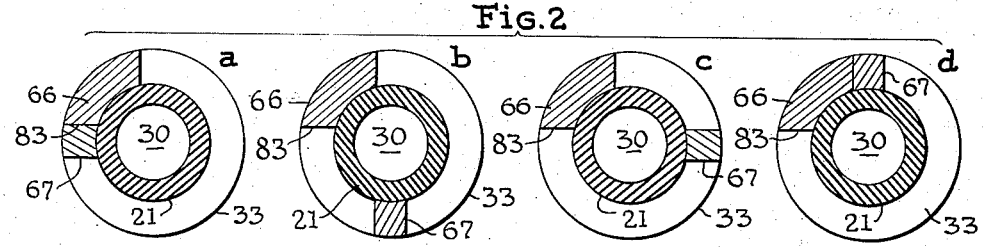
Figure 6:
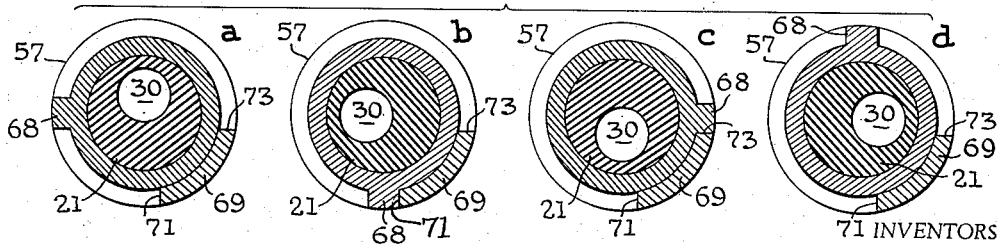

Fig. 9 is a fragmentary elevational view of the tool shown in Figs. 1-A, 1-B, and 1-C illustrating the lowering of the mandrel with relation to the sleeve as a step preparatory to rotating the mandrel counter-clockwise in plan with relation to the sleeve and then raising the mandrel with relation to the sleeve in order to change from the lug positions of Figs. 2b and 6b to the lug positions of either Figs. 2 and 6, positions c, or Figs. 2 and 6, positions d.

Fig. 10 is an elevational assembly view of the tool shown in Figs. 1-A, 1-B, and 1-C, the tool being shown as lowered into the well bore.

Figure 16:
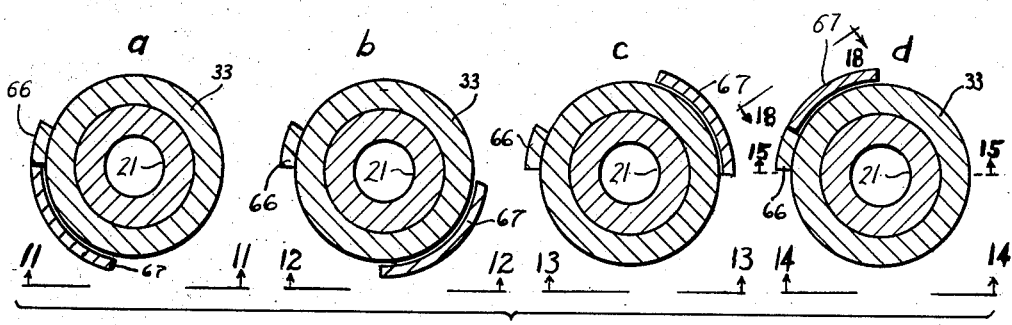
Figure 17:
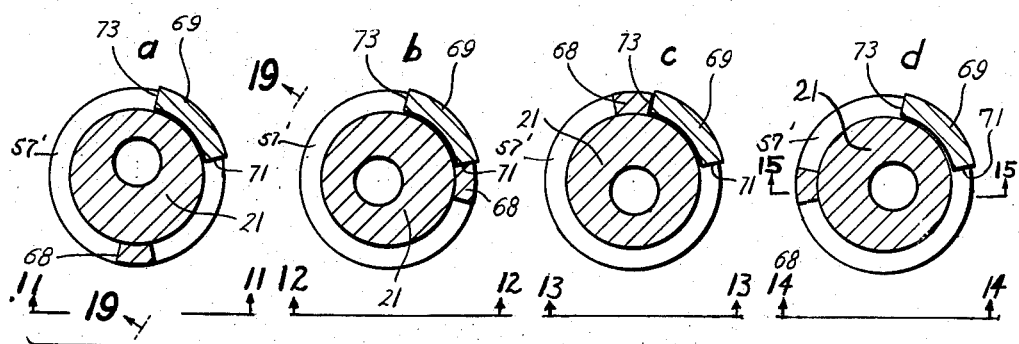
Figure 19:
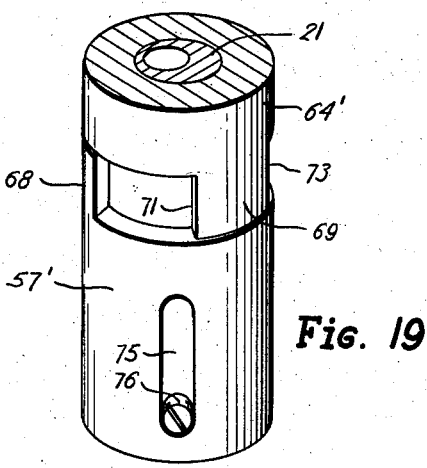
Figure 18:
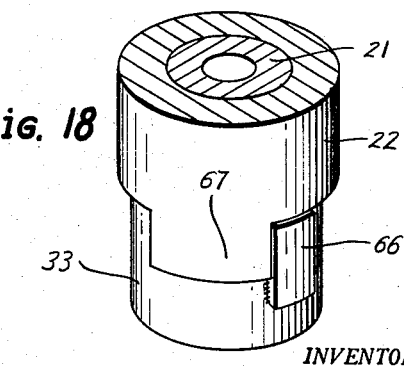

Fig. 11 is an elevational view showing another embodiment of the tool arranged for lowering in a well bore; the upper lugs being shown as viewed along line 11—11 of Fig. 16, position a, and the lower lugs being shown as viewed along line 11—11 of Fig. 17, position a;

Fig. 12 is an elevational view showing the embodiment of invention shown in Fig. 11 in position in the well bore with port opening below the packers; the upper lugs being shown as viewed along line 12—12 of Fig. 16, position b, and the lower lugs being shown as viewed along line 12—12 of Fig. 17, position b;

Fig. 13 is an elevational view showing the embodiment of invention shown in Fig. 11 in position in a perforate screen in the well bore with port opening between the packers; the upper lugs being shown as viewed along line 13—13 of Fig. 16, position c, and the lower lugs being shown as viewed along line 13—13 of Fig. 17, position c;

Fig. 14 is an elevational view showing the embodiment of invention shown in Fig. 11 in position in the well bore with port opening between and also below the packers; the upper lugs being shown as viewed along line 14—14 of Fig. 16, position d, and the lower lugs being shown as viewed along line 14—14 of Fig. 17, position d;

Fig. 15 is a fragmentary sectional elevation of the upper and lower portions of the embodiment of the invention shown in Fig. 11; the upper lugs being shown as viewed along line 15—15 of Fig. 16, position d, and the lower lugs being shown as viewed along line 15—15 of Fig. 17, position d;

Fig. 16, position d, is a sectional plan view taken along section 16—16, of Fig. 15, such figure also showing lug positions a, b, and c, corresponding respectively with positions of 90°, 180°, and 270° relative rotation between mandrel and sleeve from position d;

Fig. 17, position d, is a sectional plan view taken along line 17—17 of Fig. 15, such figure also showing lug positions a, b, and c, corresponding respectively with positions of 90°, 180°, and 270° relative rotation between mandrel and sleeve from position d;

Fig. 18 is a fragmentary perspective view taken along line 18—18 of Fig. 16, position d;

Fig. 19 is a fragmentary perspective view taken along line 19—19 of Fig. 17, position a;

Fig. 20 is a plan view taken along line 20—20 of Fig. 13 showing a typical perforated screen construction;

Fig. 21 is a fragmentary sectional view of the lower end of a tool in which such end is left open but from which the check valve provided in the two embodiments shown in the preceding figures has been omitted;

Fig. 22 is a fragmentary sectional view of the lower end of a tool from which the check valve provided in the first two embodiments, as shown in Figs. 1-C, 10 and 15, has been omitted, and in which the lower end is closed;

Fig. 23 is a sectional elevation of part of another embodiment of tool, the portion shown being the upper part thereof below the operating lugs;

Fig. 24 is a sectional elevation of the central part of the tool of which a portion of the upper section is shown in Fig. 23;

Fig. 25, position a, is a sectional plan view taken along line 25—25 of Fig. 23, such figure also showing port positions b, c, and d, corresponding respectively with 90°, 180°, and 270° relative rotation between mandrel and sleeve from position a; and Fig. 26, position a, is a section plan view taken along line 26—26 of Fig. 24, such figure also showing port positions corresponding respectively with 90°, 180°, and 270° relative rotation between mandrel and sleeve from position a.

In regard to the figures hereinabove described, the positions a, b, c, and d, described for various plan views are not to be interpreted as meaning that the tool is shifted sequentially between such positions, but rather, as will be observable hereinbelow, the tool can be shifted selectively between any two of such positions.

The embodiment of the invention shown in Fig. 1-A through Fig. 10, includes a tool 20 which comprises a central tubular member, arbor, or mandrel 21 which is adapted for connection to a stem or string of drill pipe or tubing by means of a threaded coupling 22 carried at the upper end thereof. The member 21 carries at its lower end a check valve assembly 23, including an upwardly presented valve seat 24 and a check ball 25 for seating thereon. The check ball 25 is of a diameter to permit it to pass down the mandrel bore 30, as when it may be dropped down the tubing from the top of the well.

Figure 3:
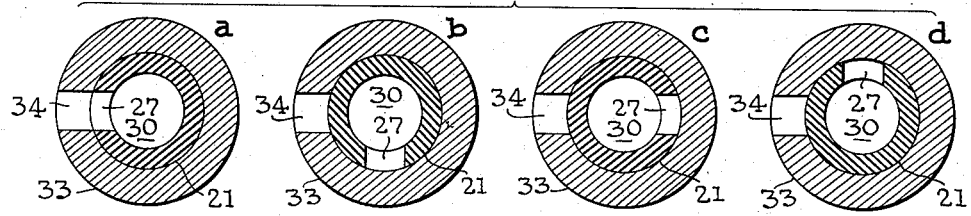
Figure 4:
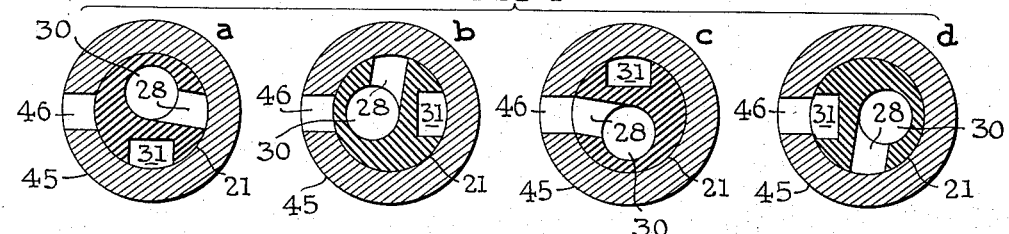
Figure 5:
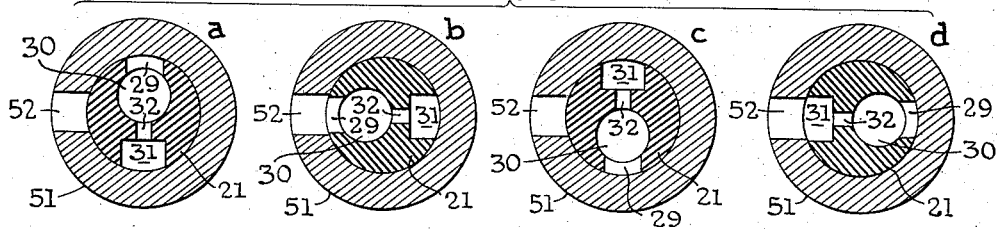

Member 21 is provided with three axially spaced radial ports 27, 28 and 29, see particularly Figs. 3, 4 and 5. A longitudinal groove or slot 31 formed in the outer surface of the tubular member 21 extends between the planes including ports 28 and 29 and is in restricted communication with the bore of the member 21 through the constantly open port 32, see particularly Figs. 1–B, 4, and 5. As shown, the tubular member 21 is encircled by a multipart sleeve assembly 26, the inner surface of which is ground and polished so as to slide and seat on the correspondingly ground and polished outer surface of the member 21.

The multi-part sleeve assembly includes an upper sleeve 33 having therein a radial port 34 which is arranged to coact selectively with the radial port 27 in the member 21, see particularly Fig. 3. Auxiliary circumferential seals in the form of O-rings 35 are provided between the member 21 and the sleeve 33 above and below the port 34.

The multi-part sleeve assembly also includes a packer sustaining portion 36. The packer assembly 49′ sustained by the portion 36 comprises a metal collar 37 which seats against a shoulder 40 provided on the portion 36 and sustains on its outer surface a cup-like packer of rubber-like material 38. A plurality of wire members of the form shown at 39 extend from the collar 37 to an apertured retaining ring 41. The members 39 serve to prevent the packer 38 from turning inside out and from hanging up in the well bore, and in general add strength to the packer.

A retaining thimble 42 encircles the collar 37 and the base of the packer 38 and is held in place by a lock nut 43 threaded onto the portion 36. Relative rotation between the sleeve 33 and the portion 36 is prevented by a projecting boss 44 carried on the sleeve 33 which reacts in a corresponding recess formed in the member 36.

A ported sleeve member 45 is threadably secured to the portion 36. It provides a radial port 46 which is arranged to coact selectively with the groove 31 and the port 28, see particularly Fig. 4. Leakage upward from the port 36 between the sleeve 45 and the member 21 is normally prevented by the close fit between these parts, but an auxiliary seal is provided in the form of an O-ring 47. A second packer sustaining member 48 is threaded into the lower end of the sleeve 45. The member 48 sustains an upwardly presented packer assembly 49 constructed in a manner identical to the packer 38.

Screw-threaded to the lower end of the member 48 is a sleeve 51 having a radial port 52. The port 52 is arranged to coact selectively with the port 29 and the groove 31, see particularly Fig. 5.

O-ring 54 acts between the member 21 and the sleeve 51 as an auxiliary seal serving to prevent leakage downward from the port 52 between the member 21 and the sleeve 51. Abutting the lower end of the sleeve 51 is a friction shoe retaining member 55. Relative rotation between the member 55 and the sleeve 51 is prevented by a lug 56 formed on the lower end of the sleeve 51 and retained in a recess formed in the upper surface of the member 55.

The member 55 comprises a sleeve 57 having a plurality of longitudinal grooves 58 in the face thereof. A friction shoe 59 having a removable friction facing 60 is supported in each of the grooves 58 and is biased outward by means of compression springs 61. Outward movement of the shoes 59 is limited by the threaded encircling collars 62 which react against the flanges 63 provided on the shoes 59. The encircling collars 62 are retained in place by means of lock nuts 64.

The sleeve 57 is provided with a counterbore at its lower end into which is received a roller thrust bearing assembly 65 which is arranged to react against the upper surface of the check valve assembly 23.

It will be noticed by reference to Figs. 1–A, 1–C, 7, 8, and 9, that rotary lost motion is provided between the member 21 and the encircling multi-part sleeve assembly 26. This is accomplished by providing the upper sleeve 33 of the multi-part sleeve assembly on its upper surface with an upwardly projecting boss 66, see Fig. 2, and by providing the coupling 22 with a coacting boss 67 which extends downwardly from the lower surface thereof. Engagement of the bosses upon rotation is assured by constructing and assembling the multi-part sleeve 26 in such a manner that when it is in either its raised position, as shown in Fig. 1–A, or in its lowered position, the bosses 66 and 67 can abut. Such abutment prevents rotation of the tool clock-wise in plan view between positions a and d.

The upper surface of the valve assembly 23 is provided with an upwardly projecting boss 68 which upon relative rotation between sleeve assembly 26 and mandrel 21 is arranged to coact selectively with shoulder 71 or shoulder 73 of a lug 69 projecting downwardly from the lower end face of the sleeve 57. Shifts between positions b and positions c are effected by lowering the mandrel 21 with relation to the multi-part sleeve 26 and then rotating the mandrel 21 over the peripheral extent of the lug 69 and then raising the mandrel 21. Fig. 9 shows the mandrel boss 68 in position to pass under the sleeve 69 as the mandrel 21 is rotated. When this occurs the bearing assembly 65, received in the sleeve 57, as stated hereinabove, remains in the sleeve 57, and the valve assembly 23, connected to the mandrel 21, moves therebelow. Thus in positions b, see Fig. 6, shoulder 71 will be effective to limit relative motion between the central member 21 and the multi-part sleeve assembly 26 and in positions c relative rotation between the member 21 and the multi-part sleeve 26 will be limited by the shoulder 73.

Another embodiment of the invention is shown in Figs. 11–20. The upper and lower ends of this second embodiment, as best shown in Fig. 15, are of a different construction from the corresponding upper and lower ends of the embodiment shown in Figs. 1–A–10, while all of the structure between the upper and lower ends shown in Fig. 15 is identical with the structure of the first embodiment described hereinabove. Thus the second embodiment below the upper lug positions is identical with the structure shown in Fig. 1–A below the lug positions in such figure; the central part of such second embodiment is identical with the structure shown in Fig. 1–B; and the lower part above the lug positions and ball bearing assembly shown in Fig. 15 is identical with the structure shown in Fig. 1–C above the lug positions and ball bearing assembly in such figure.

In this embodiment of the invention the coupling 22 which is threaded to the mandrel 21 is recessed to receive therein the thrust bearing assembly 65′ against which the sleeve 33 bears when in its upper position with relation to the mandrel so that this bearing assembly absorbs the thrust when a strain is exerted on the mandrel 21 while the sleeve assembly 23 is in a position which is controlled by the grasp it exerts outwardly, as against the well bore. This thrust bearing assembly 65′ also permits the mandrel 21 to be rotated with relation to the sleeve assembly 23, as will be described hereinbelow and in cases where constraining forces would not otherwise permit such relative rotation.

A lug 66 is provided on the periphery of the upper sleeve member 33 and extends slightly short of the upper end face of such upper sleeve member. A lug 67 is provided on the lower end face of the coupling 22, and as shown in Figs. 15 and 16 the lugs are normally bisected by a common horizontal plane so that relative rotation between the mandrel 21 and sleeve assembly 23 will bring the lugs 66 and 67 in abutment.

The lower part of the embodiment of Figs. 11–20 has a lug 68 on a position indicating sleeve 57′ which is mounted upon the head 70 of the lower mandrel extension 70' which is threadably connected to the mandrel. Such lug 68 extends upwardly from the upper end face of the position indicating sleeve 57' to bear against the lower end face of the locknut 64' which is recessed to receive therein the ball bearing assembly 65 inwardly of the upper end face of the lug 68. The lock nut 64' provides a lug 69 which extends downwardly from the lower end face thereof toward the upper end face of the head 70 so that the lugs 68 and 69 are in a common horizontal plane, as shown in Fig. 17, with the result that relative rotation between sleeve 23 and mandrel 21 will bring the lugs 68, 69 into abutment. By virtue of this abutment the sleeve 57' may in theory be considered part of the sleeve assembly 26.

A friction shoe assembly 55' of the type shown at 55 in Fig. 1–C includes the grooved sleeve 57' which is slidably mounted on the head 70 of the lower mandrel section 70' and such sleeve 57' has diametrically oppositely disposed slots 75 therein with the set screws 76 having heads to extend below the periphery of the sleeve 57' within the slots and shanks threadable into the head 70 so that the sleeve assembly 55' is rotatable with the head 70 by virtue of the contact of the head 70 against the set-screws 76. In the uppermost position of the shoe assembly 55' the internal shoulder 77 therein abuts the lower end face of the head 70, as shown in Fig. 15, and stops the shoe assembly in upward travel short of the set-screws 76. In the lowermost position of the shoe assembly 55' with relation to the mandrel 21, the lower end face of the sleeve 57' abuts the upper end face of the valve assembly 23 on the mandrel 21 and the sleeve 57' is stopped in downward travel short of the set screws 76.

In this embodiment port positions are the same as those shown in Figs. 3, 4, and 5, while upper lug positions are as shown in Figs. 16 and 18, and lower lug positions are as shown in plan in Fig. 17, and in elevation as indicated in Figs. 19 and 14. In these elevations Fig. 19 shows the condition when the indicator sleeve 57' is in uppermost position and this view is taken along line 19—19 of Fig. 17, position a; while Fig. 14 shows the condition when the indicator sleeve 57' is in lowermost position, such view being taken along line 14—14 of Fig. 17, position d.

A third embodiment of the invention is shown in Figs. 23–26. The construction of the upper portion above the break line at the top of Fig. 23 may be the same as the construction of lugs 66, 67 shown in Fig. 1–A while the lower portion below the break line at the bottom of Fig. 24 may be the same as the construction shown in Fig. 1–B below the ports 29, 32, 52 and the construction shown in Fig. 1–C. On the other hand a construction may be employed which includes from top to bottom, first, the construction shown at the top of Fig. 15, including top lug arrangement; second, the construction of Fig. 23; third, the construction of Fig. 24; fourth, the construction of Fig. 1–B below the ports 29, 32, 52; fifth, the construction of Fig. 1–C above the lugs 68, 69 and the ball bearing assembly 65; and last the construction of the lower part of Fig. 15 below the break line in such figure, including bottom lug arrangement.

In this embodiment the slot 31' in the mandrel 21 extends from the lowermost port 32 to the central port 28 and thence on upwardly in the mandrel 21 to the uppermost port 27. Then, in order to establish fluid communication between the port positions shown in Fig. 25a and the port positions shown in Fig. 26a, a port 78 is provided in the mandrel 21 to extend between the bore 30 and the lowermost port 52 in the sleeve 51, as shown in Fig. 26a. In this embodiment the central port positions are identical with the positions of Fig. 4a, b, c, and d.

In cases, when employing the structure of any of the above described embodiments, it may be desirable to carry out operations with the check ball 25, and in others it may be desirable to maintain the lower end of the mandrel unobstructed, as shown in Fig. 21. The lower end of the mandrel 21 shown in this figure has a stop collar 79 thereon to serve the same purpose as the upper end face of the valve assembly 23 serves in stopping the friction assembly 55' in its lowermost position with relation to the mandrel as in cases where the mandrel 21 may be lifted so that the set-screw 76 slides in the slot 75 as the shoes 59 frictionally engage the well bore, whereas the bore 30 of the mandrel has no check valve structure therein. In the case of the mandrel assembly of Fig. 1–C, this adaptation may be made simply by removing the check ball 25 from the terminal element 23. In other cases it may be desirable to close the lower end of the mandrel entirely in which case a cap 80 as shown in Fig. 22 may be threaded onto the mandrel 21 in place of the valve assembly 23 shown in Fig. 15, or such a cap 80 may be threaded into the lower end of the valve assembly 23 shown in Fig. 1–C.

The versatility of the tools included by this invention is obvious when their operation is concerned. Fig. 10 shows such a tool 20 connected to a drill stem, pipe stem, or tubing 85 which is being lowered into the casing 81 of a well bore 82. In order that the fluid in the well bore will not resist the downward passage of the tool 20 and displace the fluid in the tubing and casing upwardly at the top of the well by a volume corresponding with the volume of the lowered tool and drill stem, it is necessary that the fluid flow up through the tool and out therefrom into the casing. Thus no excessive force is required to force the drill stem and tool downwardly since the fluid may course through the open tool. To this end the tubing 85 and mandrel 21 connected thereto are rotated clockwise or in the direction of make-up to bring the lug 67 into face to face engagement at 83 with the lug 66 on the sleeve assembly 26, as shown in Fig. 2, position a.

In this position the check ball 25 (which may have been positioned in the tool 20 before attachment to the tubing or which optionally may have been dropped down the bore 30 after the lowering of the tubing and tool into well bore) is lifted by the upward pressure of the fluid in the well bore, and such fluid courses up the bore 30 and out the ports 27, 34 as shown in Fig. 3, position a. During this stage the central port 28, Fig. 4, position a, is occluded by the sleeve member 45. Also the lower port 29 is occluded by the sleeve member 51, and the slot 31 in the mandrel is also occluded by the sleeve members at central and lower port positions.

At this stage consideration should be given to the unique packer construction as it occurs in this combination, see Figs. 1–A and 1–B, the packers being reversely set or so designed that pressurized fluid acting downwardly from above the upper packer 49' will tend to collapse this upper packer and set the lower packer 49, whereas pressurized fluid acting upwardly from below the lower packer will tend to collapse the lower packer 49 and set the upper packer 49'. The importance of this packer operation will be obvious when certain operations are viewed.

The case arises when it is desirable to replace the circulating fluid in the tubing 85 with an acid to be forced out into surrounding formation as a later step, as will be described hereinbelow. With the above described lug positions and port openings, the acid may be pumped down the tubing 20 and the bore 30 to exert a force on the fluid in the lower tubing to seat the check ball 25 while displacing the upper tubing fluid out through the ports 27, 34. The fluid thus displaced acts downwardly to thus prevent downward passage of the displaced fluid so that such fluid is forced upwardly by the acid to the top of the well and into the reservoir thereat to be saved for further use.

Also, in this position, in cases where sand or similar material may deposit and bridge at and above the cup 42 of the upper packer 49', circulating fluid may be pumped down the tubing 85 and the bore 30 and out through the ports 27, 34 to serve in washing away the bridged material.

Additionally hot water may be circulated down the tubing 85 and out through ports 27, 34 to clean substance, as paraffin, from the casing 81 or tubing 85, or acid may thus be circulated to cut rust therefrom.

The tool 20 may be shifted to open fluid communication between the bore 30 and ports 29, 52 by rotating the drill stem or tubing 85 and mandrel 21 counterclockwise for 90 degrees to place the upper lugs 66, 67 in the relative positions shown in Fig. 2b. As there can be no upper lug engagement in this position, and as it is necessary to render an indication at the top of the well that such port engagement has been attained, it is necessary that lower lug construction render this indication, which is accomplished by the indicated impact of the lug 68 on the mandrel connected valve assembly 23 with the lug 69 on the sleeve element 57.

When this position is achieved the upper sleeve port 34 is blanked off by the mandrel 21 as is the central sleeve port 46, while fluid may be circulated down the tubing 85 into the bore 30 and out the lower ports 29, 52 into the well bore below the packers. In this position the circulated fluid forces the check ball 25 to seat and close the lower end of the mandrel 21. This position is generally selected at a level where at least the upper packer may be set in an unperforated part of the casing while the casing therebelow is perforated as indicated at 84, see Fig. 10.

In such position the fluid circulated may be such fluids as the ordinary viscous circulation fluid, or an acid, and the circulation passes through the casing perforations 84 and out into the surrounding formation 87 with no specific thought being given to recovering the fluid. In such case it is the mission of the fluid circulated to either react with or displace material in crevices and lines of cleavage in the surrounding formation 87 so that a production fluid, as oil or gas, or oil and gas in combination, may be freed to flow through such crevices and lines of cleavage and through the perforations 84 into the well bore. In such a case the forced fluid acts upwardly in the well bore to collapse the lower packer 49 and set the upper packer 49' so that such upper packer bounds the area into which the fluid is circulated and thus enables the pump pressure exerted at the top of the well to more easily force the fluid out through the perforations and into the formation 87.

In practice, it is often desirable to follow up indications that the above described operation of "slugging" or forcing a volume of fluid into the formation 85 has produced beneficial results, by an operation termed "swabbing" which entails extending a piston head down the tubing 85 for some substantial depth (such piston being suspended by a rod or cable manipulated from the top of the well) and then pulling the piston upwardly.

"Swabbing" thus consists of creating a suction in the tubing 85 below the piston which draws fluid into the bore 30 through the ports 52, 29 and also up past the lifted check ball 25 into the lower end of the mandrel. Such a suction effect relieves the static pressure on the upper packer 49' and allows the hydrostatic head of fluid above the packers to weight upon and set the lower packer 49. Further effect of such suction force draws fluid from the surrounding formation 87 through the perforations 84 and into the well bore and upwardly into the mandrel bore 30 and through the tool 20 into the tubing thereabove. This operation is conducted without requiring displacement of the sizeable fluid in the casing above the set packer and also often accomplishes an effective breakdown of the formation 87 surrounding the perforate casing section 84 to obtain a very substantial flow of produced fluids, or to cause a cavity when such may be desired for gravel packing or similar purposes not hereinbelow discussed.

In cases where it may be desired to wash and clean a perforate section of casing or a screen or liner, the tool 20 may be positioned therein by raising or lowering the tubing 85, and the direction of fluid circulation reversed and fluid circulated down the casing space surrounding the tubing. This fluid collapses the upper packer 49' and sets the lower packer 49 and then the circulated fluid flows out through the perforations 84 to wash the space 86 just outwardly thereof and to pass back through the perforations below the lower packer 49 and into the well bore for circulation up the tool 20 through the ports 52, 29 and also through the bottom of the mandrel 21 as the check ball 25 is lifted. This operation can clean occluding sand and foreign matter from the formation area 86 just outside of the perforated casing, and also it can wash and clean the perforations 84 with the result that production fluid, as oil, may flow from the formation 87 and through the perforations 84 into the casing 81. Such an operation can be employed to clean and work for production a whole length of perforated casing, it only being necessary to change the tool position at intervals from one elevation to another in the perforated casing length.

In cases where an acid has been employed, as hereinabove described, to displace the circulation fluid and such acid has been circulated out into the well bore and through the casing perforations 84 into the surrounding formation 87, the above described operations of either "swabbing," or of circulating fluid down the casing may be employed to clean acid from the perforations and to draw the acid back up the tool 20 and tubing 85 to free the bottom of the well bore from such acid.

In other usages relative movement between mandrel 21 and sleeve assembly 26 can place the bore 30 in communication with the well bore through the central ports 28, 46 as shown in Fig. 5, position c. Passage to this position from the positions of Fig. 5, position b, can be attained by lowering the tubing 85 and mandrel 21 connected thereto, as best indicated in Fig. 9, until the lug 68 on the mandrel connected valve assembly 23 clears the lug 69 on the sleeve member 57 thereabove as such sleeve member is held against movement by the frictional engagement of the friction assembly 55 with the casing 81. Then the tubing 85 is rotated at the top of the well 180° in the counterclockwise direction until impact occurs between the upper lugs 67, 66 as shown in Fig. 2, position d. Upon receiving this indication of impact, the tubing 85 is then raised to bring the mandrel assembly lug 68 into sideward alignment with the sleeve assembly lug 69 and the tubing 85 is then rotated back in a clockwise direction until impact is indicated between the mandrel assembly lug 68 and the face 73 of the sleeve assembly lug 69 and the operator at the top of the well bore 82 is advised of the attainment of this position. At such time the sleeve member 33 occludes the upper mandrel port 27 and the sleeve member 51 occludes the lower mandrel port 29, while the slot 31 is also occluded by the sleeve assembly, see Figs. 3 and 5, positions c Upon attaining this position fluid may be circulated down the tubing 85 and bore 30 to set both packers 49 and 49', and the circulating force will seat the check ball 25 at the bottom of the tool so that fluid can only pass out from the bore 30 through the ports 28, 46. As the distance between packers is short only a short length of perforated casing can be serviced at a time in this position, termed by the trade the "squeeze" position in acknowledgment of the condition whereby the closely spaced apart packers "squeeze" or restrict the fluid flow area therebetween. Under these conditions a relatively small volume of fluid may be circulated at high velocity and the outward passage of this small volume at high velocity will very positively fracture or jet away any obstructions from the perforations 84. Thus by moving the tubing 85 and the tool 20 connected thereto between different elevations of short vertical length, the perforated portion 84 of a well bore can be effectively worked together with the area 86 just outwardly thereof and the surrounding formation 87, such working being in the form of fluid circulation, as for example the circulation of acid to react with substances in crevices or lines of cleavage or to clear such fissures. By using a tool of this type in this position it is possible to force out about one barrel of circulated fluid per foot of perforated casing in a normal servicing operation.

As shown in Figs. 13 and 20, a typical screen or liner 88 is shown having the perforations 84 therethrough and longitudinally extending ridges or embossments 89 on the periphery thereof. Wire 90 is wrapped spirally around the embossments 89 with closely spaced apart distances between convolutions. Sand particles 91 commonly lodge between the embossments inwardly of the wire wrapping and it is difficult to displace this sand when servicing an extended length of liner or screen 88 since the exerted pressure acts outwardly over such extended length and lodges the sand against the wire 90 without completely removing it.

However, when fluid at the velocities obtainable in the tool position of Fig. 4c is circulated through a short vertical length of perforations 84, the sand particles 91 may be displaced upwardly and downwardly within the wire 90 and washed into the perforations 84 above the packer 49' and below the packer 49. Also in this position sand may be washed from between the packers 49', 49 by reversing direction of circulation and pumping fluid down the casing to collapse the upper packer 49' and carry such sand into the ports 46, 28 to be circulated up the bore 30.

The tool shown in Figs. 1–10 is shifted to a fourth position by rotating the mandrel in a counterclockwise direction to bring the lug 67 in abutment with the sleeve lug 66 as shown in Fig. 2, position d. In this position the upper port communication is occluded, but the central sleeve port 46 communicates with the mandrel slot 31 which extends downwardly to lower port position where the lower sleeve port 52 communicates therewith as does the port 32 which extends between the slot 31 and bore 30. In this position fluid pressure between and below the packers 49', 49 is equalized and both packers are collapsed. The size of the port 32 is necessarily limited, as by strength considerations, while there is an inherent initial clearance between the packers, as the packer 49' and the well casing or tubing. For instance the cage wires 39 will initially provide some clearance between packer and bore, fluid pressure not considered. Thus it can be seen that both packers 49, 49', are collapsible, as stated immediately hereinabove, when the fluid deliverable through the port 32 is not enough in degree to counteract the downward pressure head action of the fluid above the upper packer 49'. Thus, unless the fluid delivered through the port 32 is ample to overcome this downwardly acting fluid pressure, the upper packer will remain collapsed unless the whole tool is moved downwardly in which case the resistance of fluid below the upper packer to such downward motion will be enough to set the upper packer 49'. Then in cases as when the tubing 85 and tool 20 are withdrawn from the well bore casing fluid may course through the tool via the port 46, slot 31, and port 52, and fluid from within the tubing may course therethrough via the port 32, slot 31, and port 52. See Figs. 3–5, position d. In addition to employment in cases of withdrawal of the tool, such position also is turned to in cases where it is desired to equalize fluid pressure in the well bore above and below the packers and within and externally of the tubing.

In using the tool hereinabove described as shown in Figs. 1–10 in deep wells where there is a substantial weight of fluid in the casing to bear upon the packers and tend to force the sleeve assembly 26 downwardly, some effort may be required to shift to positions requiring both lowering and rotation. Thus when lowering of the tubing 85 and mandrel assembly 21 is required to permit the lug 68 to clear the sleeve assembly lug 69, if there is an excessive weight of supported fluid above the packers, as in deep wells, such weight will force the packer supporting sleeve assembly 26 to slide downwardly as the mandrel is lowered. Thus at times, unless the lowering and rotating is carried out expeditiously, the sleeve assembly will have time to slide downwardly to follow the lowering of the mandrel and some bit of lowering may be required before the mandrel can be lowered to sufficiently outdistance the downwardly sliding of the sleeve assembly to obtain lug clearance so that rotation can take place. To obviate such occurrence the tool shown in Figs. 11–20 has been provided, as for use in deeper wells or elsewhere where a heavy weight bears upon the packer.

In such tool, as shown in Fig. 11, in Fig. 16, position a, and in Fig. 18, upper port communication 34 is indicated by contact of mandrel assembly lug 66 and sleeve assembly lug 67, the port positions being as shown in Figs. 3–5, positions a.

Upon moving from upper port communication to lower port communication, as indicated in Fig. 12 and in Fig. 17, position b, counterclockwise rotation of the tubing 85 and mandrel assembly 21 places the lug 68 of the sleeve 57' in abutment with the face 71 of the lug 69 on the sleeve nut 64'. Then to move from lower port communication to central port communication, the tubing 85 and mandrel 21 are raised, with the result that the head 70 of the lower mandrel section 70' abuts the ball bearing assembly 65 in the lock nut 64' to lift the lock nut and sleeve assembly 26 therewith while the indicator sleeve 57' is held against longitudinal movement by virtue of the engagement of the friction assembly 55' with the well bore.

Thus the setscrew 76 in the head 70 slides upwardly in the slot 75, and the lug 69 on the lock nut 64' can clear the lug 68 on the sleeve 57'. At the top of the tool the coupling lug 67 after raising is still in a horizontal plane passing through the lug 66 on the upper sleeve member 33, by virtue of the relative longitudinal length of these two lugs, and thus the tubing 85 and mandrel 21 may be rotated in a counterclockwise direction to bring these lugs into abutment. This abutment is indicated in Fig. 16, position d, and also in Fig. 14, but such abutment is only an indication step on the way to shifting to central port communication, and its noted occurrence directs that the tubing 85 and mandrel assembly 21 must now be lowered until end face abutment is indicated, as between the bottom surface of locknut lug 69 and the upper end face of indicator sleeve 57' and/or the top surface of indicator sleeve lug 68 and the lower end face of locknut 64'. Then upon receiving this second indication, the tubing 85 and mandrel assembly 21 are shifted in a clockwise direction until abutment of the indicator sleeve lug 68 against the face 73 of the locknut lug 69 indicates arrival at the central port communication. See Figs. 16 and 17, positions c, for port positions.

From central port communication position it is easy to move to the position of equalization, Figs. 3–5, positions d, as it is only necessary to rotate the tubing 85 and mandrel assembly 21 in a counterclockwise direction to bring the mandrel assembly lug 67 into abutment with the sleeve lug 66. See Figs. 16 and 17, positions d, for lug positions, and also see Fig. 14.

It can thus be seen that the friction assembly 55' serves as an indicator of arrival at positions b and c and not as a special aid to the friction assembly 55 thereabove in maintaining the sleeve assembly 26 in firm frictional engagement with the well bore or casing 81. As a consequence it is not necessary that the springs 61' for such friction assembly 55' need be as strong as the springs 61 in the friction assembly 55 thereabove, but rather all that is needed are light springs which will not bind the sleeve assembly 55' against rotation with the mandrel 21 between positions b and c.

The modification of tool shown in Figs. 23–26 has a mandrel slot 31' which extends from upper, through central, to lower port positions. With this tool either the lug arrangements of the modification shown in Figs. 1–10, or the lug arrangements of the modification shown in Figs. 11–20 may be employed to limit and indicate the shifts between the various positions *a*, *b*, *c*, and *d*, but as shown in Figs. 25 and 26, position *a*, fluid communication is established, as when the tool is lowered into the well bore, between the lower sleeve port 52, mandrel port 78, bore 30, mandrel port 27, and upper sleeve port 34 so that in this position fluid circulates into the lower port as well as into the bottom of the tool past the check ball 25 to flow up the tool and out the port 34 as the tool is lowered. Although effective to permit lowering, such tool could not well be employed in this position to save the tubing fluid displaced by acid, nor to very effectively wash a sand bridge from above the upper packer, as in the case of the modifications described hereinabove.

This modification of tool, when including the valve assembly 23, can carry out in positions *b* and *c* the operations described hereinabove for the modification of Figs. 1–10 and the modification of Figs. 11–20. When shifted to positions *d*, as shown in Figs. 25, 4, and 26, fluid communication is established between upper sleeve port 34, slot 31', central port 46, and in lower position between lower sleeve port 52, slot 31', port 32, and bore 30. In this position fluid pressures inside and outside the bore 30 are equalized as are fluid pressures in the well bore above and below the packers, as in cases where withdrawal is desired, and more quickly than in the case of the modifications hereinabove described, as the upper and lower ports are placed in communication to let equalization begin therebetween at the same time equalization between the central and lower ports begins so that the packers 49', 49 can be expected to collapse more quickly.

Tools including less than the combinations of elements enumerated as being included in the modifications of the invention described hereinabove can be made and are claimed as being included as part of this invention. In such tools certain ports may be plugged or eliminated, or the check ball 25 may be eliminated in some cases, or in cases where such check ball is eliminated the lower end of the mandrel may be plugged or capped. Also in cases the mandrel slot extending vertically between port positions may be eliminated. In such sub-combination tools certain of the above described operations may be carried out by structures submitted to be novel in the trade and adapted to accomplish combinations of missions which cannot be accomplished by types of tools now employed in the field of well servicing.

A tool such as that shown in the embodiment of Figs. 23–26 may have the lower end of the mandrel 21 capped or plugged by a cap as shown in Fig. 22, and yet every function may be carried out as has been ascribed hereinabove to the various embodiments of Figs. 1–10, 11–20, and 23–26, when equipped with the valve assembly 23. This is apparent since the port 52 is shown open in Fig. 24 and in Fig. 26, position *a*, while the tool is being lowered, and is also shown open in Fig. 26, position *d* for pressure equalization and the raising of the tool.

However, in tools including the structures shown in Figs. 1–10 or Figs. 11–20, but with the lower end of the mandrel capped, fluid circulation upwardly therethrough cannot be provided while the tools are lowered in positions *a*, and such tools would have to be forced down the well bore as pistons are forced. However, with such tools lowering may be accomplished in positions *d* while selectively circulating fluid down the space between casing and tubing.

A sub-combination or modified tool may be provided from which the check ball 25 has been eliminated from the valve assembly 23 of Fig. 1–C, or where, as shown in Fig. 21, a stop collar 79 has been substituted for the valve assembly 23 in Fig. 15, while the tool otherwise has the operative parts and principles of the embodiments of Figs. 1–10, Figs. 11–20, or Figs. 23–26. Such tool can be operated to be lowered into the well in positions *a*, but in such positions would not be very well adapted to save the tubing fluid displaced by acid, nor would it be very effective in enabling a sand bridge to be washed from the upper packer. In such a tool the "slugging" operations from positions *b* can be effectively accomplished as well as the "swabbing" operations, and also the reversal of circulation will permit the washing of the perforations and of the formation space just outwardly thereof, and also the recovery of acid from the well below the set packer means.

However, such a tool, in positions *c*, will not function to permit the "squeezing" operation, and with circulation reversed in such position there is no full assurance that sand washed from between the packers will be substantially circulated upwardly in the bore 30. Such tool will operate effectively in positions *d* to permit the tool to be withdrawn from the well, and such raising and also fluid pressure equalization can be accomplished more efficiently with the lower end of the mandrel as well as the lower ports open.

In a tool as disclosed in any of the embodiments, modifications, and sub-combinations hereinabove discussed, stoppage of upper port communication or elimination of one or both of the ports 34, 27 will result in great difficulties in lowering the tool in positions *a*, since fluid may not circulate through the tool as it is lowered. However, if such tool is lowered in positions *d* lowering may be accomplished by selectively circulating fluid down the space between casing and tubing. When arrived in position, those operations described as relying on circulation through upper port communication must be foregone, but otherwise all operations ascribed to the "slugging" or positions *b* operations, and to the positions *d* operations may be conducted. Also those operations ascribed hereinabove to the "squeeze" or positions *c* operations may be conducted except in structures where the lower end of the mandrel is open as shown in Fig. 21.

Another condition or construction may exist where stoppage of central port communication, or the elimination of one or both of the ports 46, 28 will result in a tool incapable of setting both packers 49', 49 at the same time, and hence ineffective to carry out "squeezing" or any of the above described operations relying upon circulation through the "squeeze" positions (positions *c*). Such tools can be lowered into position in positions *a* without difficulty except in the cases of the embodiments of Figs. 1–10 and Figs. 11–20 having the lower end of mandrel closed. In such cases lowering may be accomplished by lowering in positions *d* while selectively circulating down the casing. In such tools having no central port communication fluid circulation and pressure increase above the lower packer 49 will cause it to set and fluid circulation and pressure increase below the upper packer 49' will cause it to set. Equalization as a prerequisite to withdrawal can be accomplished in the case of embodiments, modifications, and sub-combinations of Figs. 23–26 by turning to positions *d* to place upper and lower ports in communication. In the case of embodiments, modifications, and sub-combinations of Figs. 1–10, and Figs. 23–26, equalization may be accomplished as a prerequisite to withdrawal by turning to positions *a* and circulating if the upper packer 49' is set, or by turning to positions *b* and circulating if the lower packer 49 is set.

In still another condition or construction stoppage of lower port communication, or the elimination of one or both of ports 52, 29 will result in a tool incapable of being employed for "slugging" or for employment in operations requiring lower port communication, positions *b*, except, however, in the case of those modifications or sub-combinations of the embodiments of Figs. 1–10, Figs. 11–20, and Figs. 23–26 in which the lower end of the mandrel is open. Such tools with lower port communication omitted can be lowered into position without difficulty in positions *a* except in the cases of the embodiments of Figs. 1–10 and Figs. 11–20 in which the lower end of the mandrel is closed so that circulation all the way through the tool cannot be effected, but even in this case lowering can be accomplished by turning to positions *d* while selectively circulating.

In such tools with no lower port communication and with the lower end of the mandrel left open, the operations of the "squeeze" position (positions *c*) are not possible to any feasible extent because of the inability to develop sufficient pressure between the packers, as part of the circulated fluid can pass through the open lower end of the mandrel.

In these tools having no lower port communication, those having lower mandrel end open can be equalized for raising by turning first to positions *d* and then to positions *a*, while such tools having lower end of mandrel closed by check valve or cap can collapse the packers 49', 49 by "swabbing" thereabove while in positions *c* and after such collapse continued swabbing while in positions *a* can complete equalization.

In the case of tools embodying the structures of any of the embodiments, modifications and sub-combinations hereinabove discussed, but having the vertically extending mandrel slot 31 or 31' stopped or eliminated, lowering can be effected in positions *a* without difficulty with the exception of the structures of Figs. 1–10 and Figs. 11–20 having lower end of mandrel closed. In such case lowering may be accomplished by forcing the tubing and tool down the casing by circulating down the casing and through the central ports, positions *c*, and up the mandrel and tubing. In these cases of slot elimination or stoppage all other operations of positions *a*, *b*, and *c* may be conducted in the well, except the "squeeze" position operations in the case of structures having the lower end of the mandrel open. Preparatory to raising these tools having the slot eliminated, equalization of pressures inside and outside of the mandrel and above and below the packers can be accomplished, as for instance by swabbing above the packers while in positions *c* to collapse the packers and draw casing fluid into the mandrel.

As can be seen by considering these many adaptations hereinabove described, a tool is thus provided of the greatest versatility operable in cases of stoppage of port and slot communications to still carry on a number of the functions and operations conducted when in full operative condition.

Also tools which may set out to omit certain of the port communications or the slot communication for certain operative reasons are included in this invention to carry out portions of the functions attributable to the full structures. Additionally the full structures may be modified as by closing the lower end of the mandrel in cases, and omitting or spring urging the check valve downwardly or leaving the lower end of the mandrel open in other cases, as may be dictated by operative requirements, and such tools will still be of greatest versatility and adapted to carry out many of the operative functions attributable to the full structures.

This invention broadly encompasses a tool operable to circulate fluid through ports above, between, and below reversely set spaced apart packers, and selectively changeable between these various circulating positions while adapted to render positive indication at the top of the well of the arrival at such selective circulating positions. The invention also broadly considers other sub-combinations and modifications of the various embodiments of the inventions which may be constructed to accomplish its objects or parts thereof, and these variously described and disclosed embodiments, modifications, and sub-combinations are deemed to fall within the broad spirit of the invention and within the broad scope of interpretation merited for the appended claims.

We claim:

1. A well tool comprising in combination a central tubular member, said member having therein three radial passages said passages being angularly and longitudinally spaced from one another; an upward presented valve seat in the bore of said member; a valve member seated thereon by downward flow through said member and unseated by upward flow; a sleeve journalled on said member and having therein three longitudinally spaced and aligned ports, the longitudinal spacing between radial ports in the sleeve and the central member being equal and the ports being arranged in transversely aligned pairs, said member having a longitudinal flow passage formed therein, said passage having its upper end aligned transversely with the middle pair of ports and its lower end aligned transversely with the lower pair of ports; two reversely set packers carried by said sleeve, the one preventing upward flow being between the upper and middle ports and the other being between the lower and middle ports; said sleeve and central member having four operating positions in three of which a different one of the pairs of transversely aligned ports are in register and a fourth operating position in which said passage is in register with the middle and lower ports in said sleeve; and means serving to inhibit rotation of said sleeve.

2. The combination defined in claim 1, said sleeve and central member being longitudinally shiftable relatively to one another, the amount of longitudinal shifting being limited; and interengaging boss and stop structure reacting between the sleeve and the central member and effective to limit relative rotary movement thereof between the first and fourth port registering positions, said structure being effective regardless of the relative longitudinal position of the sleeve and central member; a second boss and stop structure reacting between the sleeve and the central member and effective only when said sleeve is at one of its longitudinal extreme positions to limit rotary movement thereof between said first port registering position and a second limiting position or between said fourth port registering position and a third limiting position.

3. The combination defined in claim 2 and a roller thrust bearing surrounded by the lower end of said sleeve and abutting said central tubular member.

4. A well tool comprising in combination a central tubular member; spaced shoulders formed on the outer surface of said member, said member having therein three longitudinally spaced ports; a check valve in said member beneath the lowermost port and arranged to inhibit downward flow and permit reverse flow, a sleeve journalled on said member and between said shoulders, said sleeve being shiftable longitudinally on said member, the longitudinal movement being limited by said shoulders, said sleeve and said member having a groove defined therebetween and extending longitudinally from a point adjacent the middle one of said three radial ports to a point adjacent the lower one of said radial ports; means affording a flow passage from said groove to the bore of said central tubular member; said sleeve having three ports formed therein and longitudinally spaced corresponding to the ports in said central member; a downward presented packing cup carried by said sleeve at a point intermediate the upper and middle ports therein; an upward presented packing cup carried by said sleeve intermediate the lower and middle ports therein, the ports in the sleeve and those in the central member being selectively coactive so that different ones of the transversely aligned ports are in register in each of three different operating positions of the tool, said tool having a fourth operating position in which all three sets of radial ports are out of register and in which said groove registers with the middle and lower ports in said sleeve; means to react against the well casing serving to inhibit rotation of said sleeve and to sustain the weight of said sleeve when said central member is lowered relatively thereto.

5. The combination defined in claim 4 and a boss formed on the upper shoulder; a boss formed on the sleeve, said bosses coacting to limit relative rotation of the sleeve and the central members between two operating positions, namely a first operating position in which only the upper ports are aligned and said fourth operating position; said bosses being interengageable regardless of the relative longitudinal movement of the sleeve and the central member; a projection formed on the face of the lower shoulder on the central member and a coacting projection formed on said sleeve, said projections being engageable only when the sleeve is in its lowermost position relative to the central member, said projections serving when engageable to limit rotation of said sleeve between said first operating position and a second operating position in which only the ports of the lower set are in register or to limit rotation between said fourth operating position and a third operating position in which only the ports of the middle set are in register.

6. A well tool comprising in combination a central tubular member; a check valve arranged to inhibit downward flow therethrough, said member having three longitudinally spaced radial ports therein, said ports all being above said check valve; a sleeve journalled on said tubular member and having therein three similarly spaced ports, the ports in the sleeve and said member coacting when in positively indicated, selective positions so that in each of three of said positions of the sleeve and the central member a different one of the sets of transversely aligned ports is in register, the other two sets being out of register; two reversely set packer means carried by the sleeve one inhibiting upward flow located between the middle port in the sleeve and the upper port in the sleeve and the other located between the middle port in the sleeve and the lower port in the sleeve; means arranged to react against the well casing inner periphery to inhibit rotation of the sleeve, and lug means on said central tubular member and on said sleeve at the upper and lower ends thereof to cooperate in selectively positioning said ports in register and in indicating said positions of register.

7. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, reversely set spaced apart packers on said sleeve assembly, and fluid communication means provided by said tool upon relative movement between said mandrel and said sleeve assembly to positively indicated distinct selective positions whereby pressurized fluid may be circulated in said tubing and selectively in said well bore above said packers, between said packers, and below said packers, and to collapse said packers, said packer collapsing fluid communication means including a slot in said mandrel extending from said fluid communication position below said packers to at least one of said fluid communication positions between said packers or above said packers.

8. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, reversely set spaced apart packers on said sleeve assembly, and fluid communication means provided by said tool upon relative movement between said mandrel and said sleeve assembly to positively indicated distinct selective positions whereby pressurized fluid may be circulated in said tubing and selectively in said well bore above said packers, and below said packers, and to collapse said packers, said packer collapsing fluid communication means including a slot in said mandrel extending from said fluid communication position below said packers to said fluid communication position above said packers.

9. In a tool for controlling fluid circulation in a well bore, a mandrel adapted for attachment to a tubing lowered into said well bore and movable from the top of the well, a sleeve assembly slidable upon said mandrel and adapted to frictionally engage said well bore whereby said mandrel and said sleeve assembly are relatively movable, reversely set spaced apart packer means on said assembly, said tool providing fluid communication means including fluid communication paths effective upon relative movement between said mandrel and said sleeve assembly to positively indicated distinct selective positions whereby pressurized fluid may be circulated in said tubing and selectively in said well bore above said packers, between said packers, below said packers, and to collapse said packer means, said fluid communication means including a passage through the lower end of said mandrel and said tool including a downwardly seating check valve to close said passage, said packer collapsing fluid communication means including a slot in said mandrel extending from well bore fluid communication means provided by said tool below said packers to at least one of well bore fluid communication means provided by said tool either between or above said packers.

10. In a tool for controlling fluid circulation in a well bore, a mandrel adapted for attachment to a tubing lowered into said well bore and movable from the top of the well, a sleeve assembly slidable upon said mandrel and adapted to frictionally engage said well bore whereby said mandrel and said sleeve assembly are relatively movable, reversely set spaced apart packer means on said assembly, said tool providing fluid communication means including fluid communication paths effective upon relative movement between said mandrel and said sleeve assembly to positively indicated distinct selective positions whereby pressurized fluid may be circulated in said tubing and selectively in said well bore above said packers, between said packers, below said packers, and to collapse said packer means, said fluid communication means including a passage through the lower end of said mandrel and said tool including a valve seat surrounding said passage and a floating check ball descendable through said tubing to freely seat upon said valve seat and close said passage, said packer collapsing fluid communication means including a slot in said mandrel extending from well bore fluid communication means provided by said tool below said packers to at least one of well bore fluid communication means provided by said tool either between or above said packers.

11. In a tool for controlling fluid circulation in a well bore, a mandrel adapted for attachment to a tubing lowered into said well bore and movable from the top of the well, a sleeve assembly slidable upon said mandrel and adapted to frictionally engage said well bore whereby said mandrel and said sleeve assembly are relatively movable, reversely set spaced apart packer means on said assembly, said tool providing fluid communication means including fluid communication paths effective upon relative movement between said mandrel and said sleeve assembly to positively indicated distinct selective positions whereby pressurized fluid may be circulated in said tubing and selectively in said well bore above said packers, between said packers, below said packers, and to collapse said packer means, said fluid communication means including a passage through the lower end of said mandrel and said tool including a valve seat surrounding said passage and a check valve element to seat therein, and resilient means urging said element downwardly to closed position, said packer collapsing fluid communication means including a slot in said mandrel extending from well bore fluid communication means provided by said tool below said packers to at least one of well bore fluid communication means provided by said tool either between or above said packers.

12. In a tool for controlling fluid circulation in a well bore, a mandrel having a closed lower end and adapted for attachment to a tubing lowered into said well bore and movable from the top of the well, a sleeve assembly slidable upon said mandrel and adapted to frictionally engage said well bore whereby said mandrel and said sleeve assembly are relatively movable, reversely set spaced apart packer means on said assembly, said tool providing fluid communication means including fluid communication paths effective upon relative movement between said mandrel and said sleeve assembly to positively indicated distinct selective positions whereby pressurized fluid may be circulated in said tubing and selectively in said well bore above said packers, between said packers, below said packers, and to collapse said packer means, said fluid communication means including a passage through the lower end of said mandrel effective upon tool operation to pass circulated fluid therethrough, said packer collapsing fluid communication means including a slot in said mandrel extending from well bore fluid communication means provided by said tool below said packers to at least one of well bore fluid communication means provided by said tool either between or above said packers.

13. In a tool for controlling fluid circulation in a well bore, a mandrel adapted for attachment to a tubing lowered into said well bore and movable from the top of the well, a sleeve assembly slidable upon said mandrel and adapted to frictionally engage said well bore whereby said mandrel and said sleeve assembly are relatively movable, reversely set spaced apart packer means on said assembly, said tool providing fluid communication means including fluid communication paths effective upon relative movement between said mandrel and said sleeve assembly to positively indicated distinct selective positions whereby pressurized fluid may be circulated in said tubing and selectively in said well bore above said packers, between said packers, below said packers, and to collapse said packer means, and said fluid communication means including an open passage through the lower end of said mandrel, said packer collapsing fluid communication means including a slot in said mandrel extending from well bore fluid communication means provided by said tool below said packers to at least one of well bore fluid communication means provided by said tool either between or above said packers.

14. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, reversely set spaced apart packers on said sleeve assembly, and fluid communication means provided by said tool upon relative movement between said mandrel and said sleeve assembly to positively indicated selective positions whereby pressurized fluid may be circulated in said tubing and selectively in said well bore above said packers, between said packers, and below said packers, and to collapse said packers, said fluid communication means including port means between said well bore and said mandrel above, between, and below said packers, and said packer collapsing fluid communication means including a slot in said mandrel extending from said lower port means to at least one of said port means between said packers and said port means between said packers and said port means above said packers.

15. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, reversely set spaced apart packers on said sleeve assembly, and fluid communication means provided by said tool upon relative movement between said mandrel and said sleeve assembly to positively indicated selective positions whereby pressurized fluid may be circulated in said tubing and selectively in said well bore above said packers, between said packers, and below said packers, and to collapse said packers, said fluid communication means including port means between said well bore and said mandrel above, between, and below said packers, and said packer collapsing fluid communication means including a slot extending from said lower port means to said port means between said packers.

16. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, reversely set spaced apart packers on said sleeve assembly, and fluid communication means provided by said tool upon relative movement between said mandrel and said sleeve assembly to positively indicated selective positions whereby pressurized fluid may be circulated in said tubing and selectively in said well bore above said packers, between said packers, and below said packers, and to collapse said packers, said fluid communication means including port means between said well bore and said mandrel above, between, and below said packers, and said packer collapsing fluid communication means including a slot extending from said lower port means to said port means between said packers and from thence to said port means above said packers.

17. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, reversely set spaced apart packers on said sleeve assembly, and fluid communication means provided by said tool upon relative movement between said mandrel and said sleeve assembly to positively indicated selective positions whereby pressurized fluid may be circulated in said tubing and selectively in said well bore above said packers, between said packers, and below said packers, and to collapse said packers, said mandrel and said sleeve assembly having lugs thereon providing contact establishing faces whereby selective movement between at least two of said positions is arrived at by the steps of successively vertically moving, rotating and reversely vertically moving said mandrel with relation to said sleeve assembly, said packer collapsing fluid communication means including a slot in said mandrel extending from well bore fluid communication means provided by said tool below said packers to at least one of well bore fluid communication means provided by said tool either between or above said packers.

18. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, reversely set spaced apart packers on said sleeve assembly, and fluid communication means provided by said tool upon relative movement between said mandrel and said sleeve assembly to positively indicated selective positions whereby pressurized fluid may be circulated in said tubing and selectively in said well bore above said packers, between said packers, and below said packers, and to collapse said packers, said mandrel and said sleeve assembly having lugs thereon providing contact establishing faces whereby selective movement between at least two of said positions is accomplished by the steps of successively lowering, rotating, and raising said mandrel with relation to said sleeve assembly, said packer collapsing fluid communication means including a slot in said mandrel extending from well bore fluid communication means provided by said tool below said packers to at least one of well bore fluid communication means provided by said tool either between or above said packers.

19. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, reversely set spaced apart packers on said sleeve assembly, and fluid communication means provided by said tool upon relative movement between said mandrel and said sleeve assembly to positively indicated selective positions whereby pressurized fluid may be circulated in said tubing and selectively in said well bore above said packers, between said packers, and below said packers and to collapse said packers, said mandrel and said sleeve assembly having lugs thereon providing contact establishing faces whereby selective movement between at least two of said positions is accomplished by the steps of successively raising, rotating, and lowering said mandrel with relation to said sleeve assembly, said packer collapsing fluid communication means including a slot in said mandrel extending from well bore fluid communication means provided by said tool below said packers to at least one of well bore fluid communication means provided by said tool either between or above said packers.

20. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, packer means on said sleeve assembly, and fluid communication means provided by said tool upon relative movement between said mandrel and said sleeve assembly to positively indicated selective positions whereby pressurized fluid may be circulated in said tubing and selectively in said well bore above said packer means, to extend said packer means, below said packer means, and to retract said packer means, said packer retracting fluid communication means including a slot in said mandrel extending from well bore fluid communication means provided by said tool below said packers to at least one of well bore fluid communication means provided by said tool between and above said packers.

21. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, packer means on said sleeve assembly, and fluid communication means provided by said tool upon relative movement between said mandrel and said sleeve assembly to positively indicated selective positions whereby pressurized fluid may be circulated in said tubing and selectively in said well bore above said packer means, to extend said packer means, below said packer means, and to retract said packer means, selective movement to at least two of said positions being indicated by an indicator sleeve rotatable with said mandrel and slidable vertically with relation thereto, said packer retracting fluid communication means including a slot in said mandrel extending from well bore fluid communication means provided by said tool below said packers to at least one of well bore fluid communication means provided by said tool between and above said packers.

22. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, packer means on said sleeve assembly, and fluid communication means provided by said tool upon relative movement between said mandrel and said sleeve assembly to positively indicated selective positions whereby pressurized fluid may be circulated in said tubing and selectively in said well bore above said packer means, to extend said packer means, below said packer means, and to retract said packer means, thrust bearing means being surrounded by said sleeve assembly and in abutment with said mandrel, said packer retracting fluid communication means including a slot in said mandrel extending from well bore fluid communication means provided by said tool below said packers to at least one of well bore fluid communication means provided by said tool between and above said packers.

23. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, reversely set spaced apart packers on said sleeve assembly, fluid communication means provided by said tool upon relative movement between said mandrel and said sleeve assembly to positively indicated distinct selective positions whereby pressurized fluid may be circulated in said tubing and selectively in said well bore above said packers, below said packers, and to collapse said packers, said packer collapsing fluid communication means including a slot in said mandrel extending from said fluid communication position below said packers to said fluid communication position above said packers, said mandrel and said sleeve having lug means thereon at the upper and lower ends thereof to cooperate upon said relative movement in selectively positioning said fluid communication means in said positions and in indicating said positions.

24. In a tool for controlling fluid circulation in well bores, a mandrel adapted for attachment to a tubing lowered into a well bore and moveable from the top of the well, a sleeve assembly, slidable on said mandrel and adapted to frictionally engage said well bore whereby said mandrel and said sleeve assembly are relatively movable, reversely set spaced apart packers on said sleeve assembly, fluid communication means carried by said tool upon relative movement between said mandrel and said sleeve assembly to positively indicated, distinct, selective positions whereby pressurized fluid may be circulated in said tubing and selectively in said well bore above said packers, between said packers, and to collapse said packers, said packer collapsing fluid communication means including a slot in said mandrel extending from at least one of two positions of well bore fluid communication, one position being above said packers and the other position being between said packers, and when in such position said tool providing fluid communication therefrom to the well bore below said packers.

25. A tool for controlling fluid circulation in well bores as claimed in claim 24 in which said mandrel and said sleeve have lug means thereon at the upper and lower ends thereof to cooperate upon selective mandrel rotation to position said ports in said selective positions and to indicate said positions.

26. In a tool for controlling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, reversely set spaced apart packers on said sleeve assembly, fluid communication means provided by said tool upon relative movement between said mandrel and said sleeve assembly to positively indicated distinct selective positions whereby pressurized fluid may be circulated in said tubing and selectively in said well bore above said packers, below said packers, and to collapse said packers, said packer collapsing fluid communication means including a slot in said mandrel extending from said fluid communication position below said packers to said fluid communication positions above said packers, said mandrel and said sleeve having lug means thereon at the upper and lower ends thereof to cooperate upon said relative movement in selectively positioning said fluid communication means in said positions and in indicating said positions.

27. In a tool for controling fluid circulation in well bores, a mandrel adapted for attachment to a tubing lowered into a well bore and movable from the top of the well, a sleeve assembly slidable on said mandrel and adapted to frictionally engage said well bore whereby said mandrel and said sleeve assembly are relatively movable, packer means on said sleeve assembly, fluid communication means provided by said tool upon relative movement between said mandrel and said sleeve assembly to positively indicated selective positions whereby pressurized fluid may be circulated in said tubing and selectively in said well bore above said packer means, to extend said packer means, below said packer means, and to retract said packer means, said mandrel and said sleeve having lug means thereon at the upper and lower ends thereof to cooperate in selectively positioning said fluid communication means in said positions and in indicating said positions.

References Cited in the file of this patent

UNITED STATES PATENTS

| | | |
|---|---|---|
| 1,510,669 | Halliday | Oct. 7, 1924 |
| 2,156,709 | Taylor | May 2, 1939 |
| 2,210,245 | Kimmel | Aug. 6, 1940 |
| 2,239,295 | Robinson et al. | Apr. 22, 1941 |
| 2,360,311 | Ausburn et al. | Oct. 17, 1944 |